United States Patent
Park et al.

US008811566B2

(10) Patent No.: US 8,811,566 B2
(45) Date of Patent: Aug. 19, 2014

(54) GUIDE THIMBLE PLUG FOR NUCLEAR FUEL ASSEMBLY

(75) Inventors: Nam Gyu Park, Daejon (KR); Gi-Jun Gwon, Daejon (KR); Kyeong Lak Jeon, Daejon (KR); Jung Min Suh, Daejon (KR); Jin Seok Lee, Daejon (KR); Kyong Bo Eom, Daejon (KR); Joon Kyoo Park, Daejon (KR); Jin Sun Kim, Daejon (KR); Dong Geun Ha, Daejon (KR); Kyoung Joo Kim, Daejon (KR)

(73) Assignee: Korea Nuclear Fuel Co., Ltd., Daejeon (KR)

(*) Notice: Subject to any disclaimer, the term of this patent is extended or adjusted under 35 U.S.C. 154(b) by 700 days.

(21) Appl. No.: 12/749,470

(22) Filed: Mar. 29, 2010

(65) Prior Publication Data

US 2011/0182396 A1 Jul. 28, 2011

(30) Foreign Application Priority Data

Jan. 28, 2010 (KR) .................. 10-2010-0007938

(51) Int. Cl.
*G21C 5/04* (2006.01)
*G21C 3/32* (2006.01)
*G21C 3/33* (2006.01)

(52) U.S. Cl.
CPC . *G21C 3/32* (2013.01); *Y02E 30/40* (2013.01); *G21C 3/3305* (2013.01)
USPC ........................................ 376/451

(58) Field of Classification Search
USPC ........... 376/451; 285/4, 9.2, 53, 123.1, 123.5, 285/142, 142.1, 148.22; 277/630; 137/514
See application file for complete search history.

(56) References Cited

U.S. PATENT DOCUMENTS

| 1,009,303 | A | * | 11/1911 | Hansen ................... 277/630 |
| 3,079,322 | A | * | 2/1963 | Stockdale et al. ........... 376/450 |
| 3,222,256 | A | * | 12/1965 | Fletcher et al. ............. 376/451 |
| 3,230,771 | A | * | 1/1966 | Smart et al. ................. 374/113 |
| 4,098,644 | A | * | 7/1978 | Hirama ........................ 376/412 |
| 4,317,471 | A | * | 3/1982 | King, Sr. ..................... 137/798 |
| 4,530,527 | A | * | 7/1985 | Holmberg ................ 285/382.4 |
| 4,655,990 | A | * | 4/1987 | Leclercq ..................... 376/225 |
| 4,668,469 | A | * | 5/1987 | Widener ..................... 376/446 |
| 4,778,647 | A | * | 10/1988 | Gasparro .................... 376/347 |
| 4,888,151 | A | * | 12/1989 | Gjertsen et al. ............. 376/327 |
| 4,996,018 | A | * | 2/1991 | Bhatt et al. ................... 376/203 |
| 4,996,021 | A | * | 2/1991 | Bryan ......................... 376/446 |
| 5,022,437 | A | * | 6/1991 | Potz et al. ..................... 138/89 |
| 5,068,083 | A | * | 11/1991 | John et al. ................... 376/449 |

(Continued)

*Primary Examiner* — Jack W Keith
*Assistant Examiner* — Sean P Burke
(74) *Attorney, Agent, or Firm* — Rabin & Berdo, P.C.

(57) ABSTRACT

A guide thimble plug for a nuclear fuel assembly is provided, in which an internal threaded hole is formed through a main body so that the main body is coupled to a bottom nozzle by a screw coupling. An upper insert part is formed in the upper end of the main body. The upper insert part is inserted into a shock absorption tube. A thermal deformation prevention part is formed on the main body below the upper insert part and is recessed inward from the outer surface of the main body such that, when the main body is coupled to the guide thimble, a gap is defined between the thermal deformation prevention part and the guide thimble. The guide thimble and the shock absorption tube can be reliably fastened to the bottom nozzle, and thermal deformation of the guide thimble can be minimized.

3 Claims, 7 Drawing Sheets

(56) References Cited

U.S. PATENT DOCUMENTS

| | | | |
|---|---|---|---|
| 5,600,694 A * | 2/1997 | Broders | 376/446 |
| 5,608,768 A * | 3/1997 | Matzner et al. | 376/451 |
| 7,515,674 B2 * | 4/2009 | Sparrow et al. | 376/449 |
| 7,668,284 B2 * | 2/2010 | Sparrow et al. | 376/449 |
| 2007/0160178 A1 * | 7/2007 | Walker et al. | 376/451 |
| 2008/0013667 A1 * | 1/2008 | Oh et al. | 376/451 |
| 2008/0253496 A1 * | 10/2008 | McCarty et al. | 376/327 |
| 2009/0122947 A1 * | 5/2009 | Park et al. | 376/446 |

* cited by examiner

GUIDE THIMBLE PLUG FOR NUCLEAR FUEL ASSEMBLY

CROSS-REFERENCE TO RELATED APPLICATIONS

This application claims priority under 35 USC §119 to KR 10-2010-0007938 filed Jan. 28, 2010. The disclosure of which is expressly incorporated by reference herein in their entirety.

BACKGROUND OF THE INVENTION

1. Field of the Invention

The present invention relates to a guide thimble plug for coupling a guide thimble and a shock absorption tube to a bottom nozzle of a nuclear fuel assembly.

2. Description of the Related Art

As is well known to those skilled in the art, a nuclear reactor is a device in which a fission chain reaction of fissionable materials is controlled for the purpose of generating heat, producing radioactive isotopes and plutonium, or forming a radiation field.

Generally, in light-water reactor nuclear power plants, enriched uranium (U) is used, in which the proportion of U-235 has been increased by 2-5%. To process enriched uranium into nuclear fuel to be used in nuclear reactors, uranium is formed into a cylindrical pellet having a weight of about 5 g. Several hundreds of pellets are retained in a bundle, and are inserted into a zirconium tube under vacuum conditions. A spring and helium gas are placed into the tube, and a cover is welded and sealed onto the tube, thus completing the fuel rod. A plurality of fuel rods constitutes a nuclear fuel assembly and is burned in a nuclear reactor by nuclear reaction.

Figure 1:
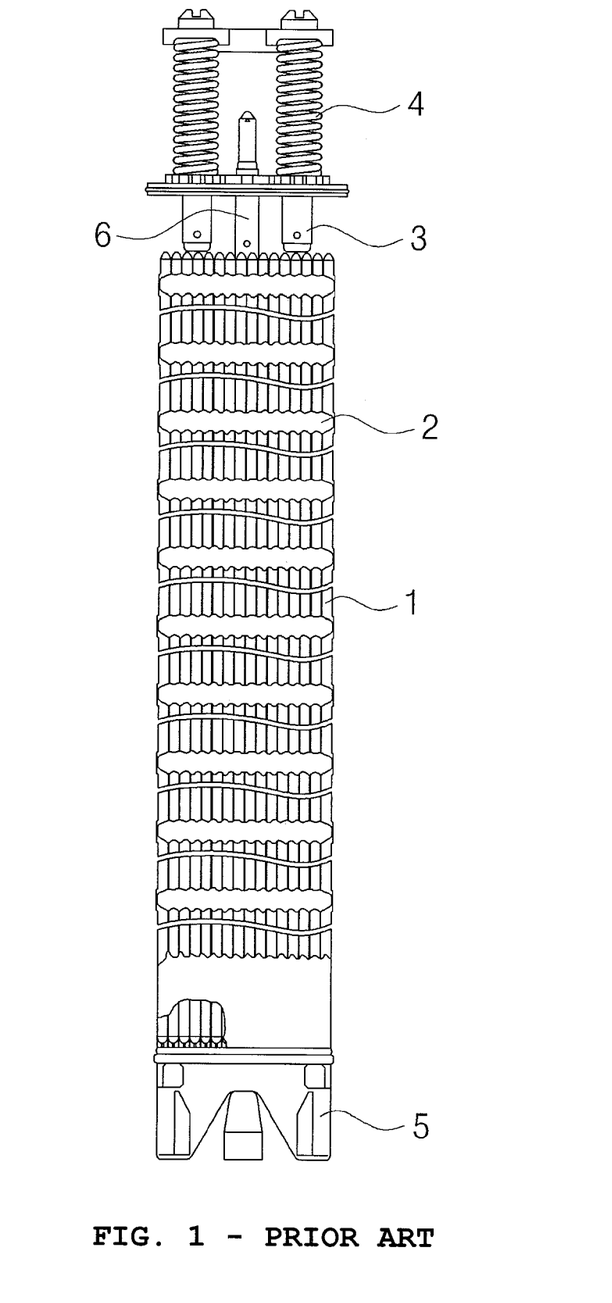
FIG. 1 is a view showing a typical nuclear fuel assembly.

FIG. 1 illustrates such a nuclear fuel assembly and elements thereof. Referring to FIG. 1, the nuclear fuel assembly includes a frame body and a plurality of fuel rods 1. The frame body includes a top nozzle 4, a bottom nozzle 5, a plurality of support grids 2, a plurality of guide thimbles 3 and a measurement tube 6. The fuel rods 1 are inserted through the support grids 2 and supported by springs (not shown) and dimples (not shown) which are formed in the support grids 2. In order to assemble the nuclear fuel assembly, lacquer is applied to the surfaces of the fuel rods 1 to prevent the fuel rods 1 from being scratched, and to prevent the springs provided in the support grids 2 from being damaged. Thereafter, the fuel rods 1 are installed in the frame body, and then the top and bottom nozzles 4 and 5 are coupled to the guide thimbles 3, thus completing the assembly of the nuclear fuel assembly. The assembled nuclear fuel assembly is tested for distances between the fuel rods, distortion, dimensions including the length, etc., after the lacquer is removed, thus completing the process of manufacturing the nuclear fuel assembly.

Figure 2A:
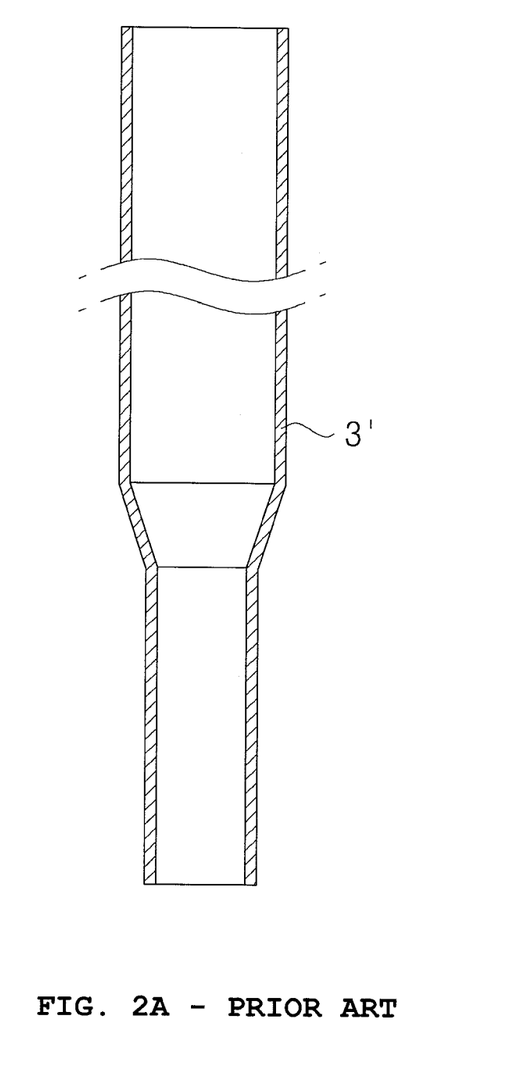
FIGS. 2A and 2B are partial sectional views showing examples of a guide thimble used in the nuclear fuel assembly of FIG. 1.

Meanwhile, the guide thimbles 3 provide passages into which control rods (not shown) can be inserted, which are used to operate or stop the nuclear reactor or control the output of the reactor. When it is desired to suddenly stop the nuclear reactor, the control rods free-fall into the guide thimbles 3. Here, to absorb impact generated by free-fall of the control rods, a shock absorption tube is provided in the lower end of each guide thimble 3. As shown in FIG. 2A, the shock absorption tube may be formed by reducing the inner and outer diameters of the lower end of a guide thimble 3'. Alternatively, as shown in FIG. 2B, a separate shock absorption tube 7 having a diameter less than the inner diameter of the guide thimble 3 may be inserted into the guide thimble 3.

Figure 2B:
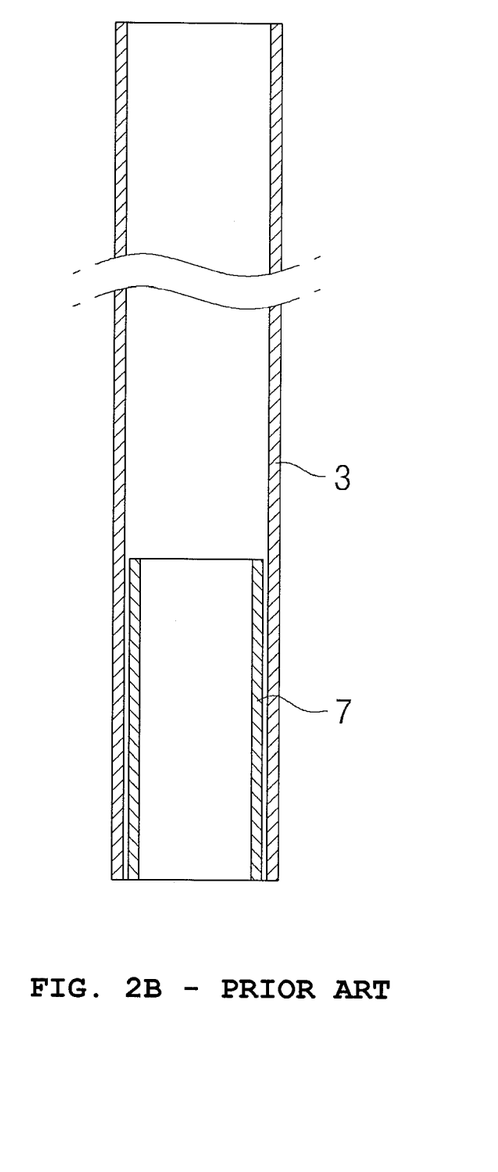

Recently, to increase lateral resistance and for ease of assembly, a double tube structure like that of FIG. 2B, in which a shock absorption tube is manufactured through a separate process and inserted into the guide thimble, is being used more frequently.

Figure 3:
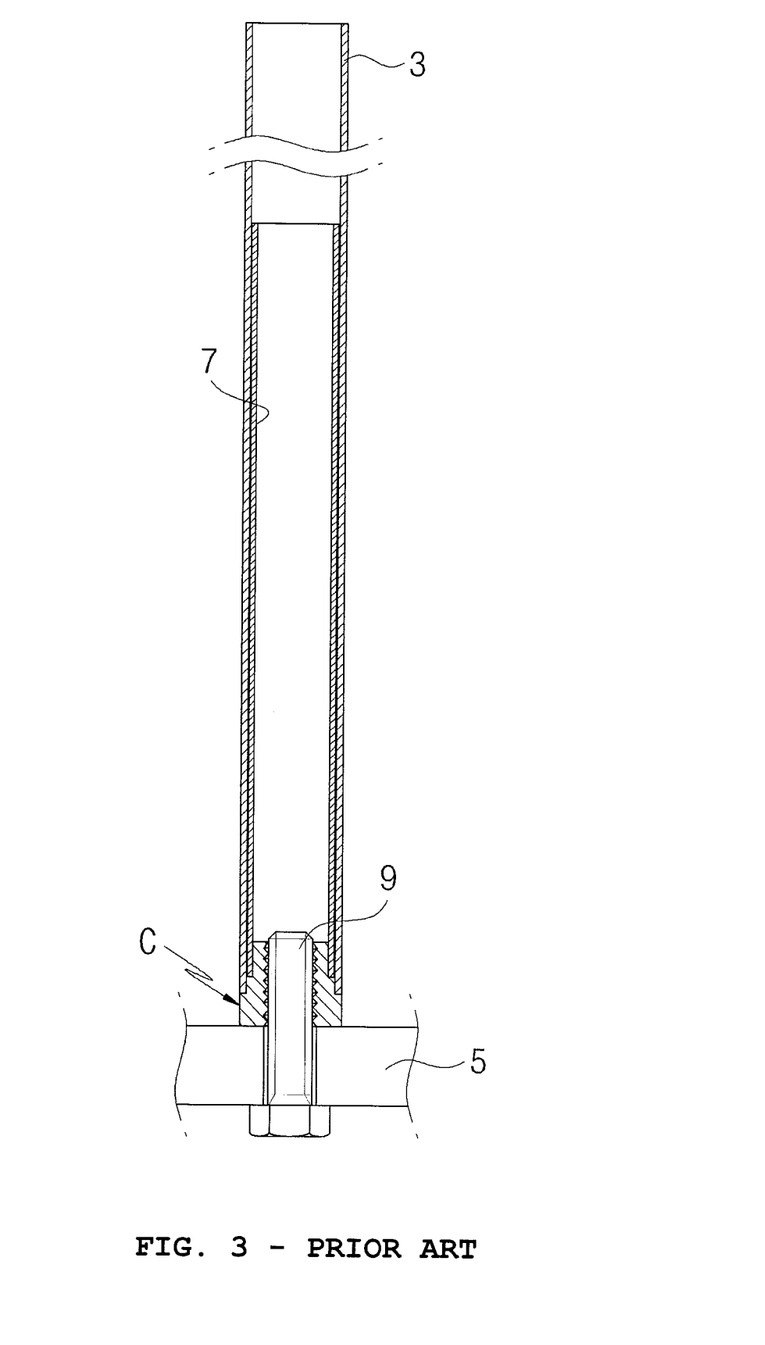
FIG. 3 is a sectional view showing a guide thimble plug by which a guide thimble and a bottom nozzle are coupled to each other, according to a conventional technique.

Here, in the case of the double tube structure, the guide thimble 3 and the shock absorption tube 7 are coupled to the bottom nozzle 5 by a guide thimble plug C. In detail, as shown in FIG. 3, the guide thimble 3 and the shock absorption tube 7 are coupled to the guide thimble plug C. The bottom nozzle 5 is fastened to the guide thimble plug C by a screw 9. Thereafter, the shock absorption tube 7 is further reliably fastened to the guide thimble 3 by a welding method or a bulging method using plastic deformation of the guide thimble 3 and the shock absorption tube 7. As such, compared to the case of the guide thimble 3' which is reduced in diameter in the lower end thereof to form the shock absorption tube, the double tube structure including the guide thimble 3 and the shock absorption tube 7 can be more easily manufactured, and resistance with respect to a lateral load can be increased. Thus, the double tube structure 3, 7 has an advantage over the guide thimble 3' in preventing the nuclear fuel assembly from being bent. Representative examples of the double tube structure of the guide thimble were disclosed in U.S. Pat. No. 4,655,990 entitled "Fuel Assemblies for Nuclear Reactor," and U.S. Pat. No. 5,068,083 entitled "Dashpot Construction for a Nuclear Reactor Rod Guide Thimble."

However, in conventional techniques, when a single guide thimble plug is welded to the double tube structure, a welded portion may be deformed, resulting in the assembly of the shock absorption tube and the guide thimble being very difficult. Therefore, the quality of the product is diminished. In other words, in the case where the shock absorption tube and the guide thimble which form the double tube structure are assembled with the single guide thimble plug by welding, the welded portion may be deformed. As a result, when the guide thimble is assembled with other elements of the nuclear fuel assembly, a large load is applied to the nuclear fuel assembly, thus reducing the productivity, and reducing the quality of the product.

That is, when the upper end of the guide thimble plug is coupled to the shock absorption tube 7, if welding is used as a means for coupling, the straightness of the guide thimble and the shock absorption tube can be compromised, or a welded portion of the shock absorption tube is expanded in diameter so that it becomes very difficult to insert the shock absorption tube into the guide thimble. Furthermore, if the guide thimble plug is coupled to the shock absorption tube by force-fitting, when the guide thimble plug is welded to the guide thimble, the shock absorption tube may be undesirably loosened or removed from the guide thimble plug by welding heat.

SUMMARY OF THE INVENTION

Accordingly, the present invention has been made keeping in mind the above problems occurring in the prior art, and an object of the present invention is to provide a guide thimble plug for a nuclear fuel assembly which is configured such that a guide thimble and a shock absorption tube which form a double tube structure can be reliably fastened to a bottom nozzle, and thermal deformation of the guide thimble can be minimized.

In order to accomplish the above object, the present invention provides a guide thimble plug for coupling a guide thimble having a shock absorption tube therein to a bottom nozzle of a nuclear fuel assembly. The guide thimble plug includes a main body. The main body has: an internal threaded hole formed therethrough so that the main body is coupled to the bottom nozzle by screw coupling; an upper insert part formed in an upper end of the main body, the upper insert part being inserted into the shock absorption tube; and a thermal deformation prevention part formed on the main body below the upper insert part, the thermal deformation prevention part being recessed inwards from an outer surface of the main body such that, when the main body is coupled to the guide thimble, a gap is defined between the thermal deformation prevention part and the guide thimble.

Preferably, an external thread can be formed on a circumferential outer surface of the upper insert part, so that the upper insert part is threaded into the shock absorption tube.

Alternatively, a caulking groove can be formed on a circumferential outer surface of the upper insert part in a circumferential direction, so that the upper insert part is coupled to the shock absorption tube by caulking.

As a further alternative, caulking depressions can be formed on a circumferential outer surface of the upper insert part at positions spaced apart from each other with respect to a circumferential direction, so that the upper insert part is coupled to the shock absorption tube by caulking.

The main body can further have a protruding part provided between the upper insert part and the thermal deformation prevention part. The protruding part supports a lower end of the shock absorption tube and has a diameter greater than a diameter of the thermal deformation prevention part, such that the protruding part is forcibly fitted into the guide thimble.

Preferably, a width of the thermal deformation prevention part can be two or more times greater than a width of the protruding part.

Furthermore, caulking groove indicators can be respectively formed in an upper surface of the protruding part at positions corresponding to the caulking depressions.

In the present invention, a shock absorption tube and a guide thimble can be reliably coupled to a bottom nozzle using a single guide thimble plug. Furthermore, thermal strain of the guide thimble can be minimized when welding for coupling the guide thimble plug to the guide thimble. Hence, the efficiency with which the nuclear fuel assembly is assembled and manufactured can be markedly enhanced.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of a guide thimble plug for a nuclear fuel assembly according to the present invention will be described in detail with reference to the attached drawings.

Figure 4:
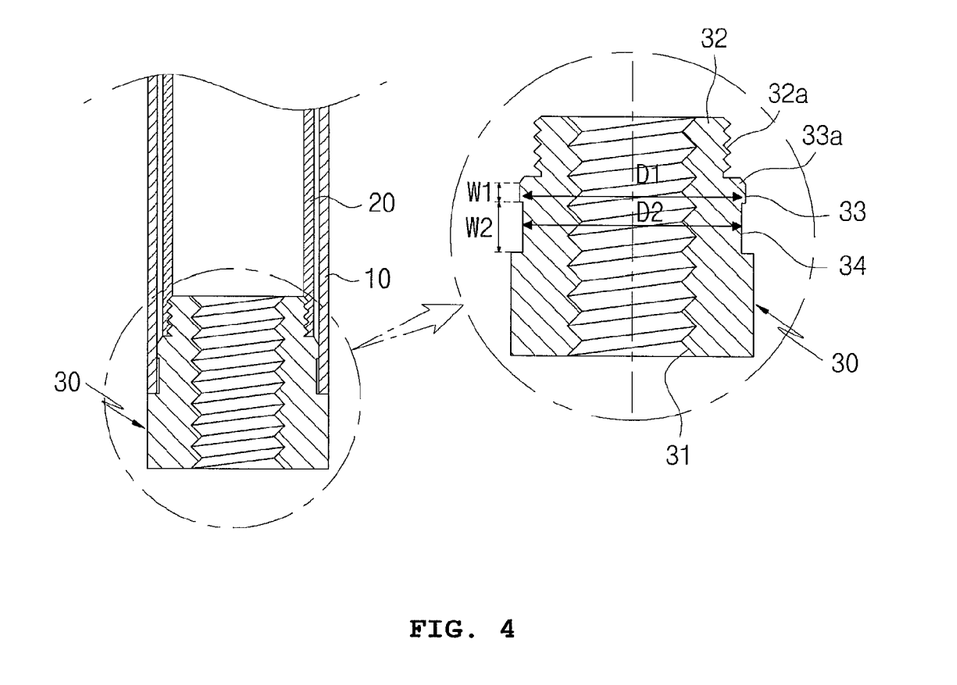
FIG. 4 is a sectional view illustrating a guide thimble plug coupled to a guide thimble, according to a first embodiment of the present invention.

FIG. 4 is a sectional view illustrating a guide thimble plug for a nuclear fuel assembly according to a first embodiment of the present invention.

As shown in FIG. 4, the guide thimble plug 30 according to the first embodiment has an approximately cylindrical main body. The guide thimble plug 30 has an upper insert part 32 which is provided on the upper end of the cylindrical main body and is tightened into a shock absorption tube 20, and a thermal deformation prevention part 34 which is recessed from the circumferential outer surface of the approximate medial portion of the guide thimble plug 30, such that a gap is defined between the thermal deformation prevention part 34 and the inner surface of a guide thimble 10 when the guide thimble plug 30 is fitted into the guide thimble 10.

An internal threaded hole 31 is formed through the guide thimble plug 30 so that a bottom nozzle is coupled to the guide thimble plug 30 by screw coupling. An external thread 32a is formed on the circumferential outer surface of the upper insert part 32 so that the upper insert part 32 is threaded into the shock absorption tube 20.

Furthermore, a protruding part 33 is provided between the upper insert part 32 and the thermal deformation prevention part 34. The protruding part 33 is forcibly fitted into the guide thimble 10. For this, an outer diameter D1 of the protruding part 33 is greater than an inner diameter of the guide thimble 10. An outer diameter D2 of the thermal deformation prevention part 34 is less than the outer diameter D1 of the protruding part 33, so that the force required to fit the guide thimble plug 30 into the guide thimble 10 is slightly mitigated, thus minimizing radial strain on the guide thimble 10 when it is coupled to the guide thimble plug 30. Preferably, a chamfered surface 33a is formed on the upper end of the protruding part 33 to facilitate insertion of the guide thimble plug 30 into the guide thimble 10.

The guide thimble 10 and the guide thimble plug 30 are coupled to each other by butt welding on the end of the thermal deformation prevention part 34. If the thermal deformation prevention part 34 is not recessed from the outer surface of the guide thimble plug 30, when the welding is conducted after the thermal deformation prevention part 34 is forcibly fitted into the guide thimble 10, the thermal deformation prevention part 34 is expanded in diameter by thermal strain and the outer diameter thereof is increased. Thus, when the thermal deformation prevention part 34 passes through a sleeve (not shown) of a support grid 2, an excessive load can be applied to the sleeve or the guide thimble 10. However, in the embodiment, because the thermal deformation prevention part 34 is recessed inward from the outer surface of the guide thimble plug 30, thermal strain when welding can be minimized.

Here, it is preferable that a width W2 of the thermal deformation prevention part 34 be two or more times greater than a width W1 of the protruding part 33, which is a portion of the guide thimble plug 30 and is substantially forcibly fitted into the guide thimble 10. This mitigates the thermal strain affecting the protruding part 33 which functions to maintain the forcibly fitted state between the guide thimble 10 and the guide thimble plug 30 when welding, thus minimizing the expansion of the protruding part 33 when welding.

Figure 5:
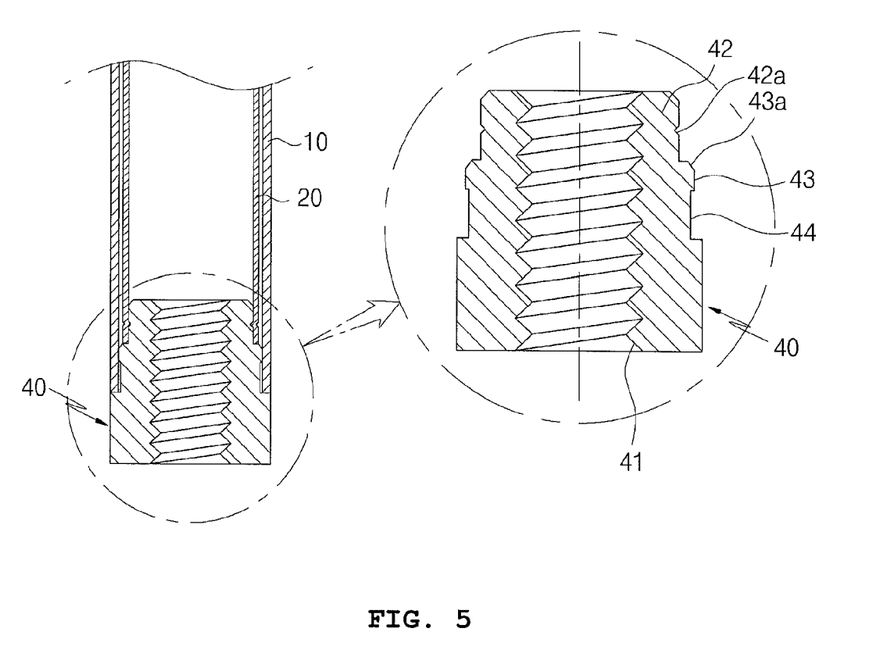
FIG. 5 is a sectional view illustrating a guide thimble plug coupled to a guide thimble, according to a second embodiment of the present invention.

FIG. 5 is a sectional view illustrating a guide thimble plug for a nuclear fuel assembly according to a second embodiment of the present invention.

As shown in FIG. 5, the second embodiment shows another example of the coupling of the guide thimble plug to the shock absorption tube. The guide thimble plug 40 according to the second embodiment includes an internal threaded hole 41, an upper insert part 42, a protruding part 43, a chamfered surface 43a and a thermal deformation prevention part 44, in the same manner as that of the first embodiment.

However, unlike the first embodiment in which the external thread 32a is formed on the circumferential outer surface of the upper insert part 32, in the second embodiment, a caulking groove 42a is formed in a circumferential direction on the outer surface of the upper insert part 42 of the guide thimble plug 40 which is fitted into a shock absorption tube 20.

After the upper insert part 42 of the guide thimble plug 40 is inserted into the shock absorption tube 20, several striking points are set on the surface of the shock absorption tube 20 at positions corresponding to the caulking groove 42a of the guide thimble plug 40, and impact is applied to the striking points. Then, the striking points of the shock absorption tube 20 are fitted into the caulking groove 42a, so that the shock absorption tube 20 can be reliably united with the upper insert part 42 of the guide thimble plug 40.

Figure 6:
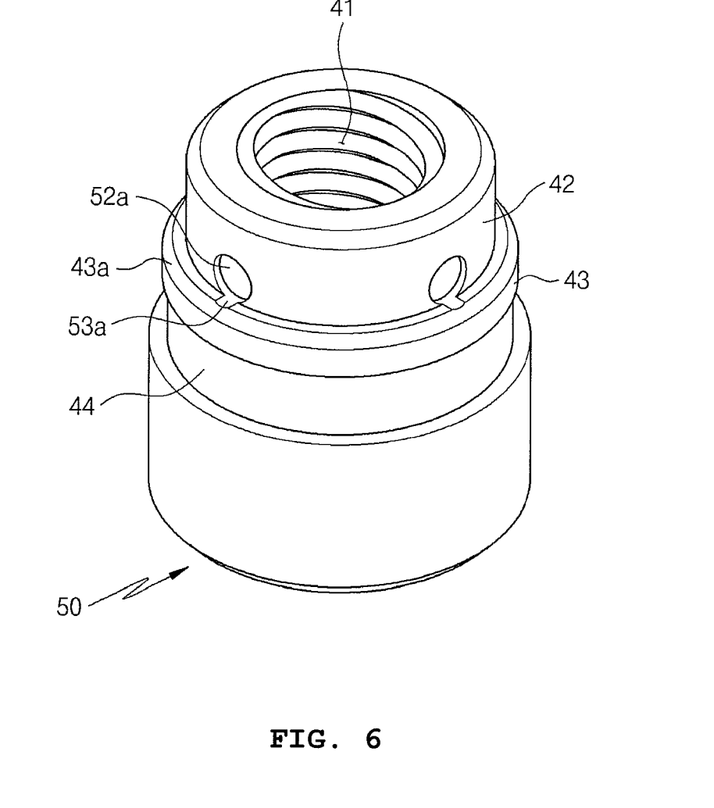
FIG. 6 is a perspective view illustrating a guide thimble plug, according to a third embodiment of the present invention.

FIG. 6 illustrates a guide thimble plug 50 according to a third embodiment of the present invention.

As shown in FIG. 6, the guide thimble plug 50 according to the third embodiment includes an internal threaded hole 41, an upper insert part 42, a protruding part 43, a chamfered surface 43a and a thermal deformation prevention part 44 in the same manner as the guide thimble plug 40 of the second embodiment.

In the case of the third embodiment, caulking depressions 52a are formed on the outer circumference of the upper insert part 42 at positions spaced apart from each other at predetermined intervals with respect to the circumferential direction, unlike the second embodiment in which the caulking groove 42a is formed in the circumferential direction on the outer surface of the upper insert part 42. Caulking groove indicators 53a are formed in the upper surface of the protruding part 43 at positions corresponding to the lower ends of the relative caulking depressions 52a. Due to the caulking groove indicators 53a, even after a shock absorption tube 20 is fitted over the guide thimble plug 50, the positions of the caulking depressions 52a can be easily indicated.

Therefore, after the upper insert part 42 of the guide thimble plug 50 is inserted into the shock absorption tube 20, striking points are set on the surface of the shock absorption tube 20 at positions corresponding to the caulking depressions 52a using the caulking groove indicators 53a, and impact is applied to the striking points. Then, the striking points of the shock absorption tube 20 are fitted into the caulking depressions 52a so that the shock absorption tube 20 can be reliably united with the upper insert part 42 of the guide thimble plug 50. In this case, because the caulking depressions 52a are formed at positions spaced apart from each other in the circumferential direction, the shock absorption tube 20 and the guide thimble plug 50 which are coupled to each other can be prevented from undesirably rotating with respect to each other around the longitudinal central axis of the shock absorption tube 20.

Instead of the caulking, without the caulking depressions 52a, spot welding can be utilized to assemble the shock absorption tube 20 and the guide thimble plug 50.

As such, according to the first through third embodiments of the present invention, the upper insert part of the guide thimble plug is united with the shock absorption tube by screw coupling or caulking, and the guide thimble plug is coupled to the guide thimble by welding.

Therefore, the shock absorption tube and the guide thimble can be reliably coupled to the bottom nozzle using the single guide thimble plug. Furthermore, because the guide thimble plug has the thermal deformation prevention part, thermal strain on the guide thimble can be minimized when welding for coupling the guide thimble plug to the guide thimble. With the present invention, the efficiency with which the nuclear fuel assembly is assembled and manufactured can be markedly enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A guide thimble plug of a nuclear fuel assembly, the guide thimble plug comprising:
a main body having an internal threaded hole located through the main body, the main body for coupling to a bottom nozzle in a lower end by the internal threaded hole and directly coupling to a shock absorption tube and a guide thimble in an upper portion thereof;
an upper insert part located in an upper end of the main body and having an external thread located on a circumferential outer surface thereof for coupling to the shock absorption tube;
a thermal deformation prevention part located on the main body below the upper insert part, the thermal deformation prevention part being recessed inward from an outer surface of the main body, wherein when the main body is coupled to the guide thimble, a gap is defined between the thermal deformation prevention part and the guide thimble; and
a protruding part located between the upper insert part and the thermal deformation prevention part and having
an upper surface in the upper insert part side, the upper surface being perpendicular to the outer surface of the main body so as to support a lower end of the shock absorption tube,
a lower surface in the thermal deformation prevention part side, and
an outer surface on a circumferential outer surface thereof, the outer surface having a diameter greater than a diameter of the thermal deformation prevention part, for being forcibly fitted into the guide thimble,
wherein a width of the thermal deformation prevention part is two or more times greater than a width of the protruding part.

2. A guide thimble plug of a nuclear fuel assembly, the guide thimble plug comprising:
a main body having an internal threaded hole located through the main body, the main body for coupling to a bottom nozzle in a lower end by the internal threaded hole and directly coupling to a shock absorption tube and a guide thimble in an upper portion thereof;
an upper insert part located in an upper end of the main body;

a caulking groove located on a circumferential outer surface of the upper insert part in a circumferential direction, the caulking groove for coupling the main body to the shock absorption tube by caulking, a thermal deformation prevention part located on the main body below the upper insert part, the thermal deformation prevention part being recessed inward from an outer surface of the main body, wherein when the main body is coupled to the guide thimble, a gap is defined between the thermal deformation prevention part and the guide thimble;

a protruding part located between the upper insert part and the thermal deformation prevention part and having
- an upper surface in the upper insert part side, the upper surface being perpendicular to the outer surface of the main body so as to support a lower end of the shock absorption tube,
- a lower surface in the thermal deformation prevention part side,
- an outer surface on a circumferential outer surface thereof, the outer surface having a diameter greater than a diameter of the thermal deformation prevention part, for being forcibly fitted into the guide thimble, and wherein a width of the thermal deformation prevention part is two or more times greater than a width of the protruding part.

3. A guide thimble plug of a nuclear fuel assembly, the guide thimble plug comprising:

a main body having an internal threaded hole located through the main body, the main body for coupling to a bottom nozzle in a lower end by the internal threaded hole and directly coupling to a shock absorption tube and a guide thimble in an upper portion thereof;

an upper insert part located in an upper end of the main body;

at least one caulking depression located on a circumferential outer surface of the upper insert part at positions spaced apart from each other in a circumferential direction, the at least one caulking depression for coupling to the shock absorption tube by caulking;

a thermal deformation prevention part located on the main body below the upper insert part, the thermal deformation prevention part being recessed inward from an outer surface of the main body, wherein when the main body is coupled to the guide thimble, a gap is defined between the thermal deformation prevention part and the guide thimble; and a protruding part located between the upper insert part and the thermal deformation prevention part, the protruding part having
- an upper surface in the upper insert part side, the upper surface being perpendicular to the outer surface of the main body so as to support a lower end of the shock absorption tube,
- a lower surface in the thermal deformation prevention part side,
- an outer surface on a circumferential outer surface thereof, the outer surface having a diameter greater than a diameter of the thermal deformation prevention part, for being forcibly fitted into the guide thimble, and at least one caulking depression indicator located on the upper surface of the protruding part, each of the at least one caulking depression indicator adjoining a respectively corresponding caulking depression, wherein a width of the thermal deformation prevention part is two or more times greater than a width of the protruding part.

\* \* \* \* \*